(12) United States Patent
Sartor et al.

(10) Patent No.: US 7,599,005 B2
(45) Date of Patent: Oct. 6, 2009

(54) METHOD FOR SYNCHRONIZING VIDEO SIGNALS

(75) Inventors: Piergiorgio Sartor, Fellbach (DE); Gil Golov, Backnang (DE); Altfried Dilly, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 568 days.

(21) Appl. No.: 11/177,027

(22) Filed: Jul. 8, 2005

(65) Prior Publication Data

US 2006/0008011 A1  Jan. 12, 2006

(30) Foreign Application Priority Data

Jul. 9, 2004 (EP) .................................. 04016252

(51) Int. Cl.
*H04N 7/00* (2006.01)
(52) U.S. Cl. ................... 348/536; 348/547; 348/548; 348/513; 375/369; 375/376
(58) Field of Classification Search ......... 348/512–520, 348/192, 193, 536, 537, 547, 548; 375/362, 375/369, 371, 376
See application file for complete search history.

(56) References Cited

U.S. PATENT DOCUMENTS

| 4,703,355 A * | 10/1987 | Cooper ..................... 348/512 |
| 5,347,322 A | 9/1994 | Levine et al. |
| 5,467,342 A | 11/1995 | Logston et al. |
| 5,596,420 A * | 1/1997 | Daum ..................... 386/110 |
| 6,233,238 B1 | 5/2001 | Romanowski et al. |
| 6,330,033 B1 * | 12/2001 | Cooper ..................... 348/512 |
| 6,493,832 B1 | 12/2002 | Itakura et al. |
| 6,724,825 B1 | 4/2004 | Nemiroff et al. |

FOREIGN PATENT DOCUMENTS

EP  0 658 046  6/1995

OTHER PUBLICATIONS

"Information Technology—Generic Coding of Moving Pictures and Associated Audio Information: Systems" ITU-T Recommendation H.222.0, XX, XX, Feb. 2000, pp. I-XVI, 1, XP001032469.
"B-ISDN ATM layer cell transfer performance" ITU-T Recommendation I.356, Mar. 2000, pp. I-VI-1-55, XP002302834.
Ishida H et al: "A multiplexing method in consideration of cell delay variation" Communications, 1994. ICC '94, SuperComm/ICC '94, Conference Record, 'Serving Humanity Through Communications.' IEEE International Conference on New Orleans, LA, USA 1-5, May 1994, 1501-1505, XP010126634.
The ATM Forum Technical Committee: ATM Forum Performance Testing Specification, 'Online! No. 96/0810R2, Oct. 9, 1996, pp. I-IV-I-29, XP002302835.

* cited by examiner

*Primary Examiner*—M. Lee
(74) *Attorney, Agent, or Firm*—Oblon, Spivak, McClelland, Maier & Neustadt, L.L.P.

(57) ABSTRACT

A method for synchronizing video signals is provided wherein a synchronization state signal is generated which is descriptive for the synchronization of an output of fields/frames with the respective input of respective fields/frames of an underlying video data screen in particular on the basis of a time difference which is given by respective counted times and/or temporal changes and/or variations thereof.

9 Claims, 1 Drawing Sheet

METHOD FOR SYNCHRONIZING VIDEO SIGNALS

DESCRIPTION

Figure 1:
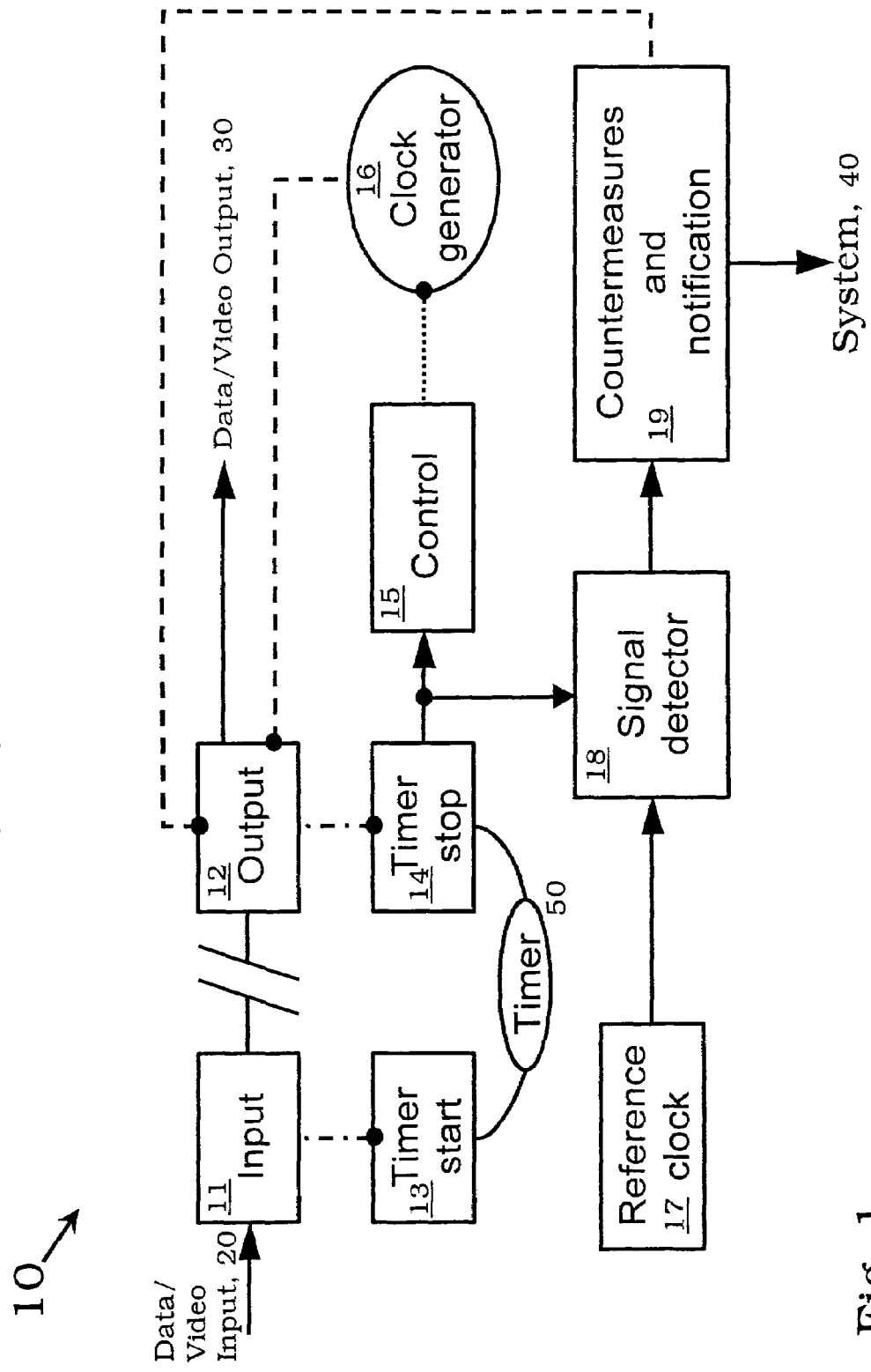

The present invention relates a method for synchronizing video signals and in particular to a method for video signal synchronization and change detection.

In the field of signal evaluation and signal processing the problem arises that certain timing properties with respect to the signal input compared to the signal output have to be fulfilled, in particular in the field of the digital video data processing. On the other hand it is possible to evaluate such timing properties between signal input and signal output in order to detect or measure certain signal changes and/or in order to derive there from further information with respect to the given data to be processed and evaluated.

Certain kinds of current technologies are based on hardware measures in order to fulfil certain timing requirements, for instance PLL circuits are used for controlling and monitoring. However, in this known technical circumstances it is hardly possible to realize real-time situations as the known technologies involved do not possess properties with respect to structural simplicity or the possibility of sufficient speed operations for real-time applications.

It is an object underlying the present invention to provide a method for synchronizing video signals and a device for realizing the same which are adapted and/or arranged in a comparable simple and nevertheless reliable manner and which allow a flexible adaptation to the respective applications and/or high speed real-time applications.

The object is achieved by a method for synchronizing video signals according to the present invention with the features of independent claim 1. Additionally, the object is achieved by a device for synchronizing video signals according to the present invention with the features of independent claim 7. Further on, the object is achieved by a computer program product and by a computer readable storage medium according to the features of independent claims 8 and 9, respectively. Preferred embodiments of the inventive method for synchronizing video signals are within the scope of the respective dependent subclaims.

The method for synchronizing video signals according to the present invention comprises steps of receiving and/or providing, processing and outputting a video data stream of field/frame data packets, of generating a respective first or output event each time a field/frame enters and/or a respective second or output event each time a field/frame leaves, of starting a respective timing or time counting process according to said first or input event and of stopping said timing or time counting process according to said respective second or output event, and of generating a synchronization state signal which is descriptive for the synchronization of the output of fields/frames with the respective input of respective fields/frames on the basis of the time difference given by said respective counted times and/or temporal changes or variations thereof.

It is therefore a basic aspect of the present invention to start a timing or time counting process in accordance to derived first and second events which are descriptive for a starting and a stopping process with respect to the time counting process and to generate a synchronization state signal in accordance with the respective counted times and/or in accordance with temporal changes or variations of the respective counted times between the output and the input time of respective fields/frames of the video data stream in question.

According to a preferred embodiment of the present invention a state of synchronization is determined for the case that said time difference is—at least approximately—constant with time.

Additionally or alternatively a state of non-synchronization is determined for the case that said time difference is—at least approximately—not constant with time.

According to a further preferred embodiment of the inventive method for synchronizing video signals said time difference is compared to at least one given and pre-defined comparison or threshold time difference value or comparison or threshold time difference rate or changing rate, in particular in order to determine said synchronization and/or said non-synchronization state.

It is of further advantage when the process of inputting and/or of the process of outputting said field/frame data packets are forced to be formed in a ring, so as to realize said comparison or threshold time difference value or comparison or threshold time difference rate or changing rate. According to this particular measure it is possible to set a distinct and wanted temporal structure between the input data and the output data in a controllable and therefore reliable manner.

According to a further advantageous aspect of the present invention the time difference and/or its temporal changes or variations may be used in order to derive properties of the input process or the input field/frame data packets or changes thereof. Additionally it is also possible to detect from the evaluation of the time difference or its temporal variations or changes a relationship between the input process and the output process.

It is a further aspect of the present invention to provide a device for synchronizing video signals which is adapted and/or arranged and which has in particular means in order to realize the inventive method for synchronizing video signals and the steps thereof.

According to a further aspect of the present invention a computer program product is provided which comprises computer program means which is adapted and/or arranged in order to realize the inventive method for synchronizing video signals and the steps thereof when it is executed on a digital signal processing means, a computer and/or the like.

As a further aspect of the present invention a computer readable storage medium is provided which comprises the computer program product according to the present invention.

In the following, these and further aspects of the present invention will be elucidated in more detail:

Abstract

This invention proposes a new method to synchronize the output to the input of a digital video processing system and to detect signal changes.

Current known technology is based on hardware PLL usage and monitoring. Usually this devices are located "far" from the processing unit and they are independent from this one. Furthermore they are connected with slow communication system (I2C), thus preventing a real-time response action in case of signal change.

Object

A basic problem to be solved is the output to input synchronization in a digital video processing system and the real-time detection of changes in the input signal stream.

It is therefore desired to realize the provision of a reliable and simple scheme for synchronizing the output stream to an input stream in a video processing system and to detect changes with respect to the input stream.

General Solution

The inventive method for synchronizing video signals comprises the steps of:
- receiving/providing, processing and outputting a video data stream of field/frame data packets,
- generating a respective first or input event each time a field/frame enters and/or a respective second or output event each time a field/frame leaves,
- starting a respective timing or time counting process according to said first or input event and stopping said timing or time counting process according to said respective second or output event,
- generating a synchronization state signal which is descriptive for the synchronization of the output of fields/frames with the respective input of respective fields/frames on the basis of the time difference given by said respective counted times and/or temporal changes or variations thereof.

Detailed Explanation

The proposed system and method for processing video stream basically involve an internal timer or timer operation. The method and the system work on the basis of field/frame data packets. Each time, a field/frame enters the system, a respective event is generated according to which the internal timer is started each time a field/frame leaves a system, a respective output event is generated upon which the respective internal timer is stopped. A state of the synchronization of the output with respect to the input is detected if a counted time difference is constant. In contrast, a non-synchronized state is given between the output and the input, if the counted time difference varies. A feedback loop is involved so as to force the counted time difference close to a given constant value and therefore to force the error—i. e. the difference—between a wanted constant value and an actual value close to zero. Thereby, synchronization between the output and the input is achieved. Additionally, by measuring the variants or variation of the time difference with time changes of the input signal and therefore changing input sources and their features may be detected.

As synchronization is achieved internally, external time-consuming processes can be avoided and certain properties of the input source and the input signals may be derived by internal measures only. Additionally, the invention enables fast and therefore real-time processing for real-time responses in case of signal changes.

The inventive method and apparatus may simplify the structure and methods for video processing and may enable video processing systems to have real-time capabilities and internal and fast adaptation features.

The invention proposed operates within a video processing system capable of handling only field/frame data packet. Typically this systems are not capable of acting at line level only. Extensions in this direction are possible and also, depending on the implementation (precision), it will be possible to have video line resolution in the operating performances.

A typical video processing system, usually based on DSP, but also on dedicated hardware, receives fields/frames as input and produces fields/frames as output. Each time a field/frame is in the system, an event is generated (interrupt in case of DSP) and each time a field/frame leaves the system, an other, different, event is generated. Such a system must have, of course, the capability of changing the output clock frequency, required in order to perform synchronization, and must have time-stamping capability, i.e. must have a timer. The resolution of the timer, i.e. how many "ticks" per second does it measure, is a first indication of the "precision" that will be possible to achieve. High-resolution timers, around 1 to 50 millions of ticks per second or more, can enable the system to achieve line level synchronization.

The invention operates in this way: when an input event is received, i.e. a field/frame is in the system, the timer is started. When an output event is received, i.e. when a field/frame leaves the system, the timer is stopped. Normally, if the output is synchronized with the input, the time difference is constant. Furthermore it can be set to be a specific constant. The difference between the current taken time difference and the wanted time difference represent an error that can be used by a feedback control loop. The error is passed to a control procedure, producing new frequency a setting for the output clock. Consequently the output will synchronize to the input and so the error will go close to zero.

Now, during normal operation, as stated above, the error is close to zero. So a second opportunity is given, in order to detect some signal feature, by monitoring this error. Whenever the error suddenly changes from being close to zero to an "high" value, then it will be possible to state that something happened to the input, like channel change (in case of tuner), signal disconnect/reconnect or bad signals, like VCRs. This will allow the system to take countermeasures in order to avoid artifacts due to broken fields/frames in the system or poor analog front end performances, for example blanking the output or freezing it to the last good picture for a certain amount of time. Eventually additional detection mechanism available in an other part of the system can be used to confirm the current signal situation and to support further, extended, countermeasures, like complete disable of synchronization or change of control algorithm parameters. An other option is to reconfigure the signal processing chain in a more robust state. In such state some features are sacrificed which requires more stable input signal properties. This "save" mode is left when a stable input signal is detected again.

Monitoring the error, for example measuring the jitter or other frequency characteristics, can also give indication on the input signal quality and suggest countermeasures to the processing system.

Monitoring a secondary error between the output clock and a fixed, expected standard, clock can give information on the type of input source, for example will detected if a VCR is connected or something else.

Finally, if the output to input time is taken not each field/frame, but each N input field/frame and M output field frames, it is possible to have output frequency different from the input, but still synchronized with it. For example in case video format conversion is required, like 50 Hz to 100 Hz, setting N=1 and M=2, or 50 Hz to 75 Hz, setting N=2 and M=3.

Advantages

Advantages are an optimum result, with minimum effort, flexibility and scalability. The invention is adaptable to software or hardware solution.

FIG. 1 is a schematical block diagram which elucidates some basic aspects of an embodiment of the inventive method for synchronizing video signal.

FIG. 1 is a block diagram which shows an embodiment of the inventive method 10 for synchronizing video signals.

FIG. 1 shows an input section 11 and an output section 12 which are arranged and/or adapted in order to receive and emit, respectively, signals of data and in particular signals corresponding to digital video data. Between these two sections 11 and 12 of inputting and of outputting video signals a certain timing relationship or synchronization has to be established. Therefore a timer or timing process 50 is given. This timer or timing process is arranged and/or adapted to realize a timer or timing start process 13 each time a field/frame of said video data stream is entered or a respective first or input event appears. On the other hand the timer or timing process is arranged and/or adapted to realize a timer or timing stopping process 14 each time a field/frame of said video data stream leaves and/or a respective second or output event appears. By using a signal detecting section 18 and a respective reference clock process 17 the timer start and timer stop processes 13 and 14 as well as the time counting operation of the timer process 50 are evaluated in order to notify the respective timing conditions between the input and the output and to realize some appropriate counter measures 19 with respect to the system 30 underlying the present video signal synchronization process 10. According to the counter measures 19 the output process 12 may be influenced.

On the other hand the respective timer or timing start and timer or timing stop processes 13 and 14 as well as the counting process realized by the timing or timer process 15 may also be evaluated by a control section 15 which in turn controls a further clock generating process 16 in order to further influence the output process 12.

According to the action of the method 10 described in FIG. 1 a distinct timing relationship or temporal relationship between the data/video input 20 and the data/video output 30 can be realized according to the present invention.

REFERENCE SYMBOLS 10 method
11 input process
12 output process
13 timer start process, timing start process
14 timer stop process, timing stop process
15 controlling process, controlling section
16 clock generating section, clock generating process
17 reference clock generating process
18 signal detection process
19 counter measure process, notifying process
20 data/video input
30 data/video output
40 system
50 timing section, timer

The invention claimed is:

1. Method for synchronizing video signals, comprising the steps of:
receiving/providing, processing and outputting a video data stream of field/frame data packets,
generating an input event each time a field/frame enters and an output event each time a field/frame leaves,
starting a respective timing or time counting process according to the input event and stopping a same process according to said output event,
generating a synchronization state signal which is descriptive for the synchronization of the output of fields/frames with the input of fields/frames on the basis of the time difference given by said counted times and/or temporal changes or variations thereof,
calculating an error value as the time difference between the counted time differences and a wanted time difference, which has previously been set, and
forwarding the error value to a feedback loop, which is adapted to force the counted time difference close to said wanted time difference.

2. Method according to claim 1, wherein a state of synchronization is determined for the case that said time difference is—at least approximately—constant with time.

3. Method according to claim 1, wherein a state of non-synchronization is determined for the case that said time difference is—at least approximately—not constant with time.

4. Method according to claim 1, wherein said time difference is compared to at least one given and pre-defined comparison or threshold time difference value or comparison or threshold time difference rate, in particular to determine said synchronization and/or said non-synchronization state.

5. Method according to claim 4, wherein the process of inputting and/or of outputting said field/frame data packets are forced to be performed in a way so as to realize said comparison time difference.

6. Method according to claim 1, wherein said time difference is used so as to derive properties of the input process or the input field/frame data packets or changes thereof.

7. A device for synchronizing video signals, comprising:
an input section and an output section respectfully configured to
receive/provide, process and output a video data stream of field/frame data packets; and
a timer configured to
generate an input event each time a field/frame enters and an output event each time a field/frame leaves,
start a respective timing or time counting process according to an occurrence of said input event and stop said process according to an occurrence of said output event, and
generate a synchronization state signal that is descriptive for the synchronization for the output of fields/frames and with the input of fields/frames on the basis of the time difference between said counted times and/or temporal changes or variations thereof; and
a signal detecting section configured to
calculate an error value as the time difference between the counted time differences and a wanted time difference, which has previously been set, and
forward the error value to a feedback loop, which is adapted to force the counted time difference close to said wanted time difference.

8. A computer program product having computer readable instructions that when executed by a processor perform steps comprising:
receiving/providing, processing with the processor and outputting a video data stream of field/frame data packets;
generating an input event each time a field/frame enters and an output event each time a field/frame leaves;
starting a respective timing or time counting process with a timer according to the input event and stopping a same process according to said output event;
generating a synchronization state signal which is descriptive for the synchronization of the output of fields/frames with the input of fields/frames on the basis of the time difference given by said counted times and/or temporal changes or variations thereof;
calculating with the processor an error value as the time difference between the counted time differences and a wanted time difference, which has previously been set; and
forwarding the error value to a feedback loop, which is adapted to force the counted time difference close to said wanted time difference.

9. The device of claim 7, further comprising:
a signal detection section; and
a reference clock processor configured to evaluate the timer start and timer stop processes and a time counting operation of the timer process,
notify the respective timing conditions between the input and output, and realize appropriate counter measures influencing the output process.

* * * * *